April 7, 1942.　　　R. G. PIETY　　　2,278,668

DEMODULATION OF FREQUENCY MODULATED OSCILLATIONS

Filed Jan. 12, 1939　　　2 Sheets-Sheet 1

Inventor
Raymond G. Piety
By
Attorney

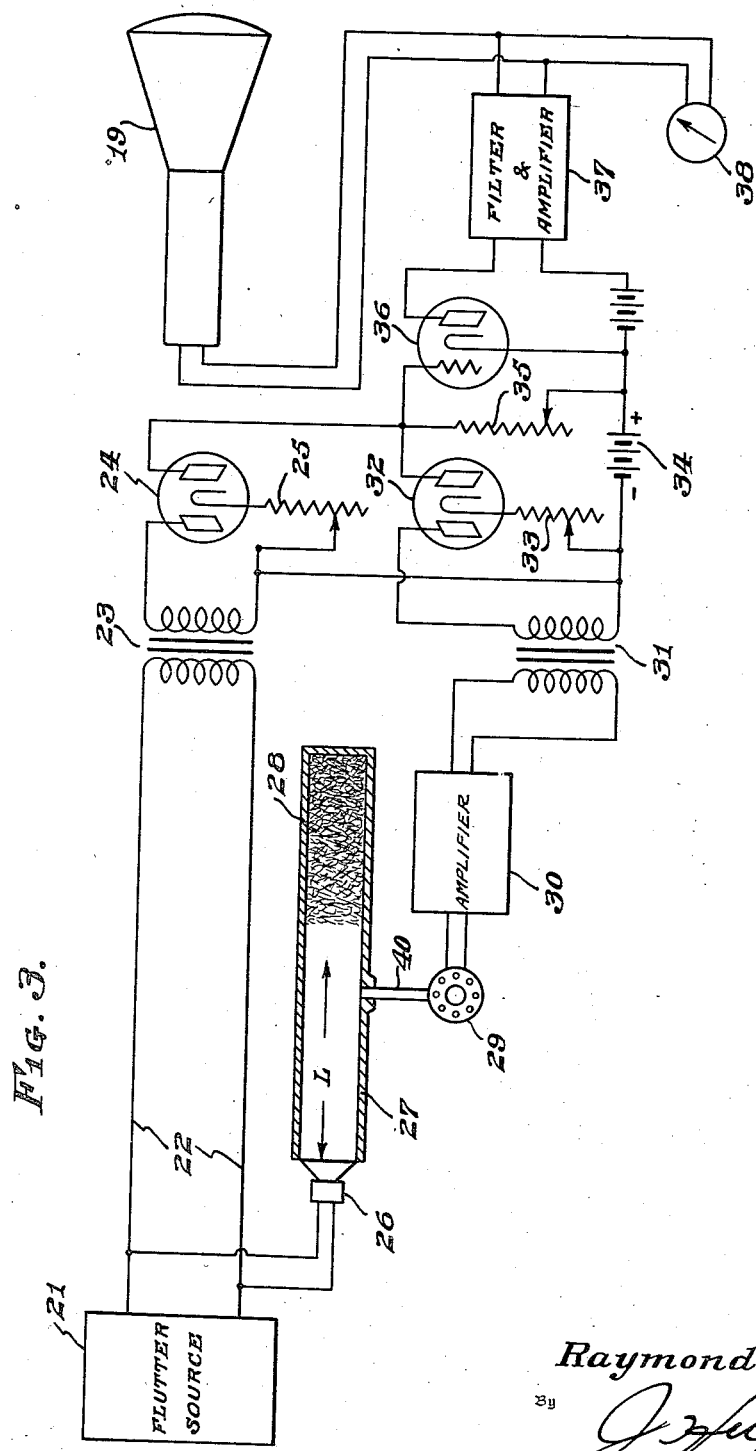

Patented Apr. 7, 1942

2,278,668

UNITED STATES PATENT OFFICE 2,278,668

DEMODULATION OF FREQUENCY MODULATED OSCILLATIONS

Raymond G. Piety, Bartlesville, Okla., assignor to Radio Corporation of America, a corporation of Delaware Application January 12, 1939, Serial No. 250,504

3 Claims. (Cl. 172—245)

This invention relates to the demodulation of frequency modulated oscillations, and has for its principal object the provision of an improved system whereby an electric current proportional to the instantaneous frequency is readily derived and indicated or measured.

There are two general types of modulation which may be applied to an electric oscillation. They are commonly designated as amplitude and frequency modulation. This invention is concerned with the latter type of modulation, which is created whenever the frequency of oscillation is made to vary each side of its average value. The process of demodulation consists in causing the modulated signal to create an electric current which is proportional to the instantaneous frequency. The present invention involves a new method of obtaining this current. This method is not only useful for ordinary communication purposes, but is sufficiently sensitive and free from the extraneous effects of simultaneous amplitude modulation, to be used for the measurement of the small amount of undesirable frequency modulation present in many types of electrical apparatus.

Viewed from another aspect, the invention relates to an apparatus for determining slight variations in the speed of sound reproducing and, other apparatus required to be operated at a substantially constant speed. Such variations tend, for example, to produce corresponding variations in reproduced sound commonly referred to as "flutter." For instance, it is well known that very small variations in the linear speed of sound film or disc recordings will materially affect the quality of the recordings. This is caused by the frequency shift that any change in speed creates. Even though the effects are apparent to the ear, the percentage of frequency modulation is so small that a very efficient demodulator is required to measure it. This is especially difficult because the amplitude modulation due to accidental causes is frequently even larger, though less objectionable, than the frequency modulation to be measured, and so masks out the quantity being measured. This invention produces the desired result by combining a circuit arrangement which only allows an output current to flow, provided two voltages are simultaneously positive, with a time delay network.

Stated more specifically, the invention may involve an electrical measuring system including a delay circuit so connected that variations in speed are impressed on one portion of the system as variations in phase of the reproduced sound waves, the sound frequency being then filtered out to leave only the voltage produced by the phase variations, which is then utilized to indicate the amount of flutter.

An important object of the invention is to provide a novel means for measuring the amount of speed variation in a sound reproducing apparatus.

Another object is to provide a novel indicating means which will indicate speed variations directly and independently of the sound frequency being reproduced.

Another object is to provide a flutter bridge involving phase shifting means for determining the amount of flutter in terms of phase difference.

The invention will be better understood from the following description considered in connection with the accompanying drawings and its scope is indicated by the appended claims.

Referring to the drawings,

Figure 3 illustrates a modified form wherein mechanical or acoustic time delay or phase shifting means are utilized.

Figure 1:
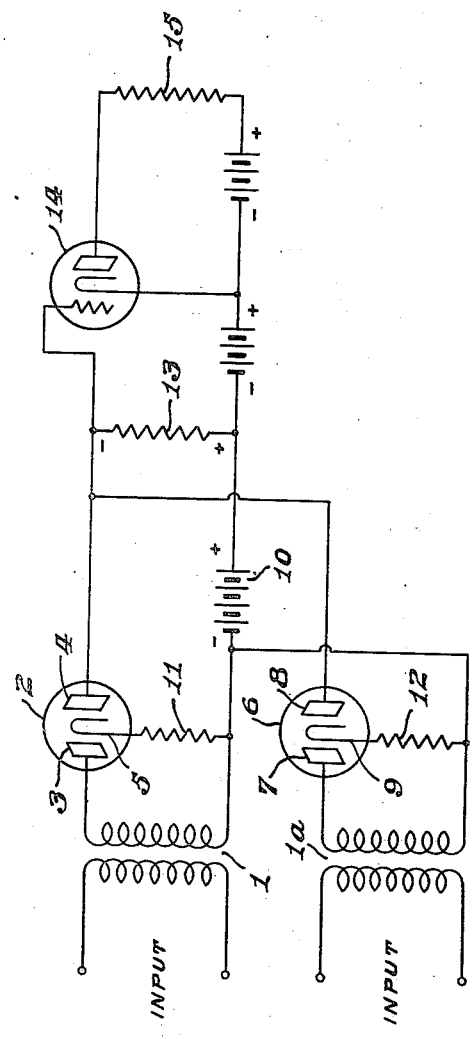
Figure 1 is a wiring diagram illustrating certain features of the invention.

The circuit of Fig. 1 includes two input transformers I and Ia and a vacuum tube 2 provided with two anodes or plates 3 and 4 and a cathode 5, or two diodes with the cathodes connected together. A similar tube 6, provided with anodes 7 and 8 and with a cathode 9, is connected between the transformer Ia and the output of the tube 2. A battery 10 causes current to flow through cathode resistors 11 and 12 and coupling resistor 13, since the plates 4 and 8 are more positive than the cathodes 5 and 9. If the plate 3 is made positive it will cause a current to flow through resistor 11, which will make the cathode 5 more positive and reduce the voltage drop from plate 4 to cathode 5. When this drop becomes zero the battery 10 will no longer produce a current across the plate 4 to cathode 5. A negative voltage across transformer I or Ia will not produce any effect. When the voltages of transformers I and Ia are sufficiently positive, they will completely stop the flow of current through the output resistor 13. For all other conditions there will be a current through the resistor 13.

The bias on the output tube 14 is so adjusted that a small negative voltage stops the flow of plate current through the output resistor 15. This combination of circuit elements produces a device which only produces a drop across resistor 15 when the voltages across input transformers 1 and 1a are simultaneously positive and no drop when one or the other or both are negative. In the normal operation of this device with small receiving type tubes and a substantially sinusoidal voltage across the input transformers, the battery 10 may be of the order of three volts and the input potential about 40 volts, so that the output would be quite closely a measure of the time during which both voltages were positive. Since the turning off and on period would only occupy about 1% of a cycle, this could be even further decreased if low capacity diodes are used to prevent stray feeds.

Now if two voltages of the same frequency are impressed on transformers 1 and 1a, with a phase difference of say 90°, the drop across resistor 13 would be zero approximately one-quarter of the time, since two such sinusoidal voltages are both positive one-quarter of the time. If the voltages approach each other in phase, the average current through the resistor 13 will decrease until at zero phase difference it will flow for one-half of the time. If the phase difference increases, the current through resistor 13 will increase since at 180° it will never drop to zero.

Current flows through resistor 15 only when the drop across resistor 13 is zero and this circuit, therefore, has the desired result of producing an output proportional to the phase difference between input voltages of transformers 1 and 1a over the operating range of slightly less than 180°. The cycle reverses in the range from 180° to 360° and then repeats, and so on.

Figure 2:
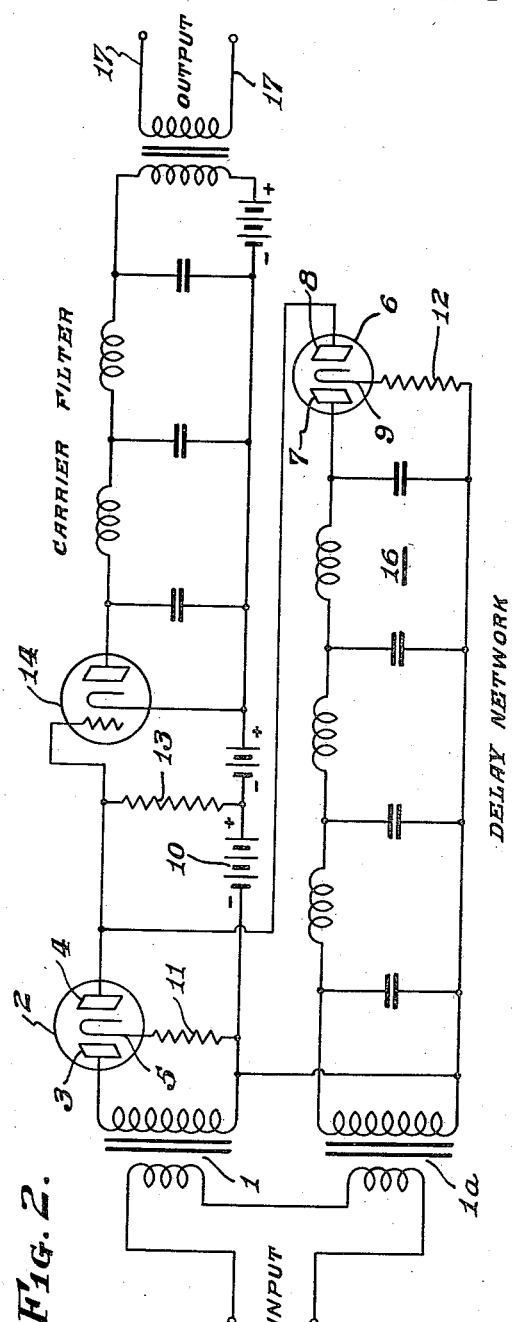
Figure 2 is a wiring diagram of a system embodying the invention.

Now suppose there is introduced, ahead of the tube 6, a delay network 16 (Fig. 2) whose phase shift is proportional to frequency. Any time delay network has the property of shifting the phase proportional to frequency. (The time delay of any network at a given frequency is equal to the slope of the phase characteristic at that frequency.) Now since the output is proportional to the phase difference between the input voltages of the tubes 2 and 6, and the phase difference is proportional to the frequency, the output will be proportional to the instantaneous frequency. This is just the requirement for the demodulation of a frequency modulated oscillation. The network is chosen normally so that the carrier or average operating frequency is shifted by 90° so that deviations of equal amounts, in the instantaneous frequency, up or down, may be measured. The time delay nework 16 of Fig. 2 is the ordinary low pass filter, for which the phase shift is just 180° from zero frequency to the cut-off frequency, per section. The phase shift per unit frequency change is quite linear up to one-half the cut-off so that this provides a convenient region of operation. The choice of cut-off and number of sections is governed by the operating frequency, and the percentages of modulation to be measured. For high frequencies a band pass filter would be advantageous where the choice of pass band is governed by the sensitivity and width of the linear phase characteristic portion of the pass band. The voltage across the output 17 consists of a series of rectangular pulses of constant height but variable width proportional to the applied frequency. When the carrier and higher components are filtered out there will be only the modulation component left, just as in the case of amplitude modulation where the carrier is filtered out of the detector plate circuit. The time delay or phase shifting network may be purely mechanical or acoustical as in Fig. 3.

In the system of Fig. 3, the sound reproducer 21, or other device in which the flutter is to be measured, is provided with a constant frequency sound record. The frequency involved in this record is not critical, but should be rather high and at a point of high response of the apparatus. The higher the frequency, the less time delay is necessary in order to produce a predetermined angular phase shift. On the other hand, the frequency should not be too high or the angular shift of phase due to flutter may approach or even exceed 90°, in which case accurate measurement of the flutter would become difficult. For these reasons, I have found a frequency of 2,000 cycles per second to be appropriate in the use of the device.

Electrical output from the flutter source 21 is transmitted through the line 22 to the transformer 23, which is connected to one anode of the double diode 24 and is connected to the cathode thereof through the resistor 25. A portion of the output from the flutter source transmitted to the line 22 is transmitted to the loudspeaker 26 at one end of an acoustic transmission line 27, the opposite end of which is filled, as indicated at 28, with an absorbent material tapered in density to prevent reflection of sound and to give the transmission line 27 the same characteristic as if it were a pipe of infinite length.

A microphone 29 is placed adjacent the side of the transmission line 27 and is appropriately connected thereto as, for example, by pipe 40, at such a location that the delay between the speaker 26 and the microphone 29 will correspond with a predetermined shift of phase. For example, the microphone 29 may be so placed as to provide a time delay corresponding to approximately 20° phase shift for the highest frequency that is to be measured.

Output from the microphone 29 is fed through the amplifier 30, which brings it to an amplitude corresponding to the input to the transformer 23, and is then fed through the transformer 31 to one anode of the double diode 32, being connected to the cathode thereof through the resistor 33. The battery 34 applies voltage through the other anodes of the diodes 24 and 32, thereby producing a voltage drop across the resistors 25 and 33 and across the resistor 35. The resistor 35 and the battery 34 are so adjusted that, when no impulses are transmitted through either transformer 23 or 31, the amplifying tube 36 is biased sufficiently to prevent the flow of current therein or, as commonly stated, the tube 36 is biased to cut-off.

If voltage is applied across transformer 23 alone, as soon as this voltage reaches a value higher than that of the battery 34, no current flows through the resistor 35. Otherwise stated, during the time that the first plate of the double diode 24 is positive, a current flows through the resistor 25, which sets up an E. M. F. tending to oppose the flow of current from the second plate of this double diode. Similar action occurs at the diode 32, and therefore plate current will flow through the tube 36 only when diodes 24 and 32 have a positive voltage on their first anodes. The result of this is that the plate current in the tube 36 will correspond to the relative phase difference of any signal impressed upon the diodes 24 and 32 during a period of time which is determined by the delay of the acoustic circuit 27 through which the voltage is impressed on the transformer 31.

The output of the tube 36, of course, includes the audio frequency impressed through the two diodes 24 and 32. This audio frequency is filtered out by the filter and amplifier 37 and the voltage due to phase difference is amplified and impressed upon the meter 38. The output from this amplifier may also be impressed upon the cathode ray oscillograph 19, from which the wave shape of the flutter frequency may be determined.

Any variation in speed in the flutter source 21 will be impressed upon the transformers 23 and 31 at different times, the delay time thereof being determined, as before described, by the acoustic circuit 27, and this speed variation or frequency will, therefore, appear in the tube 36 as a phase difference between the delayed signal and that which is not delayed.

The time delay is preferably set at such a point that the average phase difference between the voltages in the transformers 23 and 31 is 90°, thus producing a linear relation for the output of the tube 36 between current and phase angle for about ±70° phase shift.

The insensitivity of this system to amplitude modulation arises from the fact that an amplitude modulated wave crosses the zero axis at precisely the same time intervals independent of the percent modulation. The modulation only changes the slope of the voltage-time curve as it crosses the axis; this slope can only affect the output during the small interval of time taken by the valving action, or about 1% of the time for modulations up to 10 or 20%. This is much higher than the accidental variations of amplitude present in an application of frequency modulation. Insensitivity to the carrier frequency may be provided by allowing sufficient length to the linear phase characteristic. The calibration of this device when used for measurement purposes is only limited in constancy by the batteries and the tube voltage, so that percentages of frequency modulation of the order of 0.01% may be measured. In telemetering it is frequently desirable to avoid the effects of amplitude changes so that frequency modulation of the signal voltage is an advantage. This circuit is well adapted to this application because of its simple mode of operation.

I claim as my invention:

1. In an apparatus for producing a potential proportional to the frequency of an applied impulse, the combination of an electron discharge device provided with an output circuit and with a negatively biased input circuit including an impedance device, and impulse detecting means including a pair of rectifier elements each provided with an output circuit including an anode electrode connected in parallel to said impedance and an additional electrode provided with an input circuit and with an impedance device common to its input and output circuits.

2. In an apparatus for producing a potential proportional to the frequency of an applied impulse, the combination of an electron discharge device provided with an output circuit and with a negatively biased input circuit including an impedance device, impulse detecting means including a pair of rectifier elements each provided with an output circuit including an anode electrode connected in parallel to said impedance and an additional electrode provided with an input circuit and with an impedance device common to its input and output circuits, impulse delay means interposed in the input circuit of one of said last named anode electrodes, and means providing a common source of energy coupled to said input circuits.

3. In an apparatus for producing a potential proportional to the frequency of an applied impulse, the combination of an electron discharge device provided with an output circuit and with a negatively biased input circuit including an impedance device, impulse detecting means including a pair of rectifier elements each provided with an output circuit including an anode electrode connected in parallel to said impedance and an additional electrode provided with an input circuit and with an impedance device common to its input and output circuits, acoustical phase shifting means interposed in the input circuit of one of said last named anode electrodes, and means providing a common source of energy coupled to said input circuits.

RAYMOND G. PIETY.